US011519743B2

(12) United States Patent
Sasaki et al.

(10) Patent No.: US 11,519,743 B2
(45) Date of Patent: Dec. 6, 2022

(54) STALLED SELF-DRIVING VEHICLE RESCUE SYSTEM

(71) Applicant: International Business Machines Corporation, Armonk, NY (US)

(72) Inventors: Yuka Sasaki, Kawasaki (JP); Reiya Takemura, Adachi-ku (JP); Kenji Uchida, Meguro-ku (JP); Sanehiro Furuichi, Setagaya-ku (JP)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 17/024,338

(22) Filed: Sep. 17, 2020

(65) Prior Publication Data
US 2022/0082395 A1 Mar. 17, 2022

(51) Int. Cl.
| | |
|---|---|
| *G01C 21/34* | (2006.01) |
| *G01C 21/36* | (2006.01) |
| *G08G 1/00* | (2006.01) |
| *B60W 60/00* | (2020.01) |
| *G06N 20/00* | (2019.01) |
| *H04W 4/46* | (2018.01) |

(52) U.S. Cl.
CPC ....... *G01C 21/3461* (2013.01); *B60W 60/001* (2020.02); *G01C 21/3407* (2013.01); *G01C 21/3691* (2013.01); *G06N 20/00* (2019.01); *G08G 1/22* (2013.01); *H04W 4/46* (2018.02); *B60W 2556/65* (2020.02)

(58) Field of Classification Search
CPC ...... H04W 4/46; G06N 20/00; B60W 60/001; B60W 2556/65; G01C 21/3407; G01C 21/3691; G08G 1/22
See application file for complete search history.

(56) References Cited

U.S. PATENT DOCUMENTS

| | | |
|---|---|---|
| 8,996,224 B1 | 3/2015 | Herbach |
| 9,635,534 B2 | 4/2017 | Maier |

(Continued)

FOREIGN PATENT DOCUMENTS

| | | |
|---|---|---|
| CN | 102419171 A | 4/2012 |
| CN | 107862640 A | 3/2018 |

(Continued)

OTHER PUBLICATIONS

WO2021029460A1 Machine Translation (Year: 2019).*

(Continued)

*Primary Examiner* — Anne Marie Antonucci
*Assistant Examiner* — Jingli Wang
(74) *Attorney, Agent, or Firm* — Stephen R. Yoder

(57) ABSTRACT

Aspects of the present invention disclose a method for assisting a stalled autonomous vehicle in an incommunicable area. The method includes one or more processors determining a route of an autonomous vehicle. The method further includes identifying an area of the route of the autonomous vehicle that includes a communication outage. The method further includes determining a driving difficulty of one or more segments of the route of the autonomous vehicle within the area. The method further includes determining a location of the autonomous vehicle within a segment of the one or more segments of the route based at least in part on the driving difficulty of the segment.

14 Claims, 3 Drawing Sheets

(56) References Cited

U.S. PATENT DOCUMENTS

| | | | |
|---|---|---|---|
| 9,720,410 B2 | 8/2017 | Fairfield | |
| 10,353,387 B2 | 7/2019 | Stenneth | |
| 2009/0248219 A1 | 10/2009 | Kawauchi | |
| 2016/0026187 A1 | 1/2016 | Alam | |
| 2016/0139594 A1 | 5/2016 | Okumura | |
| 2017/0309086 A1 | 10/2017 | Zhai | |
| 2018/0061148 A1 | 3/2018 | Dudar | |
| 2019/0137996 A1 | 5/2019 | Zhang | |
| 2019/0197497 A1* | 6/2019 | Abari | G05D 1/0027 |
| 2019/0250621 A1 | 8/2019 | Ghannam | |
| 2020/0191582 A1* | 6/2020 | Urano | G06Q 10/02 |
| 2020/0264003 A1* | 8/2020 | Ebner | G01C 21/3461 |

FOREIGN PATENT DOCUMENTS

| | | | |
|---|---|---|---|
| CN | 108880655 A | 11/2018 | |
| JP | 2005104327 A | 4/2005 | |
| JP | 2017083919 A | 5/2017 | |
| JP | 2019128244 A | 8/2019 | |
| KR | 20180070070 A | 6/2018 | |
| WO | 2014137271 A1 | 9/2014 | |
| WO | WO-2021029460 A1 * | 2/2021 | B60W 30/14 |

OTHER PUBLICATIONS

"2D fast-mapping for emergency response and public safety", PIX4D, © 2020 Pix4D SA, 11 pps., <https://www.pix4d.com/product/pix4dreact>.

"Concorda", ERTICO, printed from the Internet on Sep. 2, 2020, 4 pps., <https://ertico.com/concorda/>.

"Demonstration of truck platooning on expressways", Jun. 25, 2019-Feb. 28, 2020, Shin Tomei Expressway, Jun. 7, 1st year of Reiwa, Copyright© 2008 MLIT Japan, 2 pps., <https://translate.google.com/translate?hl=en&sl=ja&u=https://www.mlit.go.jp/report/press/jidosha07_hh_000306.html&prev=search&PTO=aue>.

"Drone Bird" project to create aerial maps in the event of a disaster, Jan. 16, 2016, Cabinet Office, Government of Japan, 87 pps., <https://qzss.go.jp/news/archive/dronebird_160116.html>.

"Emergency—3D Mapping Services", DELAIR, © 2020 Delair, 3 pps., <https://delair.aero/portfolio/emergency-mapping/>.

"Enabling autonomy through teleoperation", printed from the Internet on Aug. 31, 2020, 12 pps., <https://phantom.auto/>.

"Platooning Together", ENSEMBLE, printed from the Internet on Sep. 2, 2020, 7 pps., <https://platooningensemble.eu/>.

Katayama, "Evacuation guidance support using cooperative agent-based IoT devices", 2017 IEEE 6th Global Conference on Consumer Electronics (GCCE 2017), 2 pps., <https://ieeexplore.ieee.org/document/8229431>.

Krutsinger, "How to Drone Map a Disaster Zone in 60 minutes or Less", Feb. 20, 2019, 4 pps., <https://www.suasnews.com/2019/02/how-to-drone-map-a-disaster-zone-in-60-minutes-or-less/>.

* cited by examiner

STALLED SELF-DRIVING VEHICLE RESCUE SYSTEM

BACKGROUND OF THE INVENTION

The present invention relates generally to the field of Internet of Things (IoT) and more particularly to rescuing low functioning autonomous vehicles.

In recent years, developments in advanced controls systems have provided autonomous vehicles to operate safely with little or no human input. An autonomous vehicle is a vehicle capable of sensing a surrounding environment and operating without human involvement. Additionally, a human passenger is not required to take control of the vehicle at any time, nor is a human passenger required to be present in the vehicle at all. Autonomous vehicles combine a variety of sensors to perceive the surroundings environment, such as radar, lidar, sonar, global positioning system (GPS), odometry, and inertial measurement units. Autonomous vehicles utilize advanced control systems interpret sensory information to identify appropriate navigation paths, as well as obstacles and relevant signage.

Additionally, developments in navigation systems have become efficient in providing directions to users. Many navigation systems provide users with routes based on traffic flow, accidents, time of day, etc. Typically, navigation systems use a satellite navigation device to get its position data which is then correlated to a position on a road. A user may request directions when needed and routing can be calculated on the continuously using traffic information to adjust the route.

Furthermore, autonomous vehicles demand efficient route planning in a dynamically changing environment. Existing navigation systems consist mainly in the analysis of static parameters (e.g., total route length or road type), and even recent systems rarely use dynamic data (e.g., average driving speed in selected hours). In modern navigation systems the dynamic properties of traffic and road conditions are still not considered enough. Therefore, in many cases the autonomous vehicles must recognize traffic and road conditions in advance or in the place of an event.

SUMMARY

Aspects of the present invention disclose a method, computer program product, and system for assisting a stalled autonomous vehicle in an incommunicable area. The method includes one or more processors determining a route of an autonomous vehicle. The method further includes one or more processors identifying an area of the route of the autonomous vehicle that includes a communication outage. The method further includes one or more processors determining a driving difficulty of one or more segments of the route of the autonomous vehicle within the area. The method further includes one or more processors determining a location of the autonomous vehicle within a segment of the one or more segments of the route based at least in part on the driving difficulty of the segment.

DETAILED DESCRIPTION

Embodiments of the present invention allow for predicting a position of a stalled autonomous vehicle in an incommunicable area and dispatching an autonomous vehicle to rescue the stalled autonomous vehicle. Embodiments of the present invention receive road conditions of an incommunicable area from an advanced autonomous vehicle and determines a driving difficulty for segments of an incommunicable area. Embodiments of the present invention estimate the presence and position of a stalled autonomous vehicle based on impossible or difficult autonomous driving conditions of the incommunicable area and performance capabilities of the stalled autonomous vehicle. Additional embodiments of the present invention deploy an autonomous vehicle to assist a stalled autonomous vehicle traverses an incommunicable area, which includes driving conditions that exceed capabilities of the stalled autonomous vehicle.

Some embodiments of the present invention recognize that in the event of an emergency autonomous vehicles will likely be unable to travel due to road damage and road obstacles and that communications will likely be unavailable due to power outages and/or sediment disasters. As a result, conventional methods of rescue (e.g., by means of remote operation) will become problematic. Various embodiments of the present invention provide a solution to the problematic conventional methods by deploying an autonomous vehicle to assist the autonomous vehicles in traversing an incommunicable area that includes driving conditions that exceed capabilities of the autonomous vehicles.

Various embodiments of the present invention can operate to prevent reduced data speeds and connectivity loss due to increased request traffic of network devices caused by autonomous vehicles with suspended travel progress within an area of a municipal area network (MAN) with limited resources. Embodiments of the present invention can resolve this issue by assisting the autonomous vehicles in traversing the area with limited resources prior to the suspended travel progress, which reduces the traffic of the network devices at a predetermined location (e.g., incommunicable area) of the MAN. Thus, improving the efficiency of a network at the predetermined location of the MAN. Embodiments of the present invention improve current traffic monitoring systems by adding the ability to rescue an autonomous vehicle that has become unable to travel due to travel conditions caused by disasters.

Implementation of embodiments of the invention may take a variety of forms, and exemplary implementation details are discussed subsequently with reference to the Figures.

Figure 1:
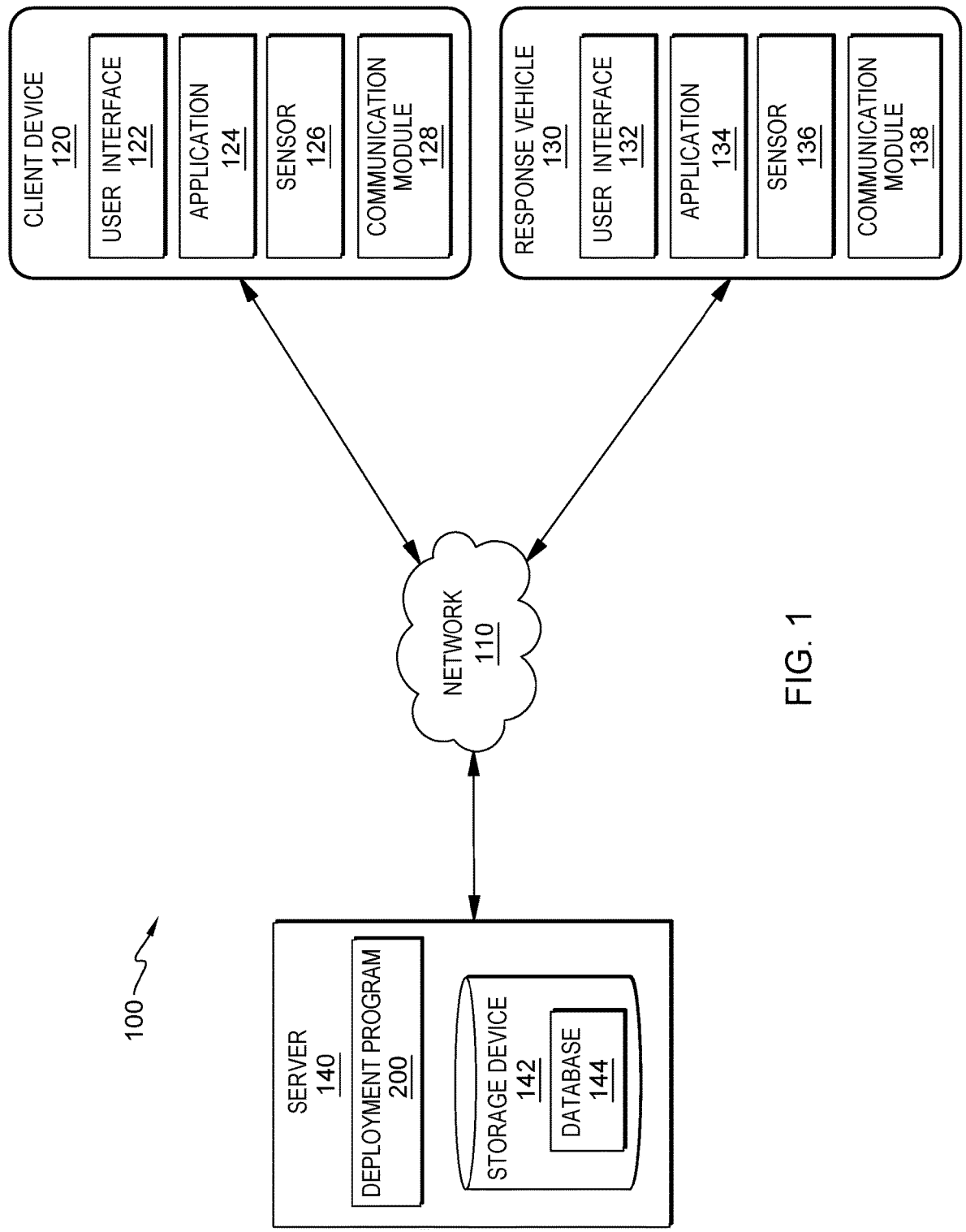
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Deployment program 200 enables the authorized and secure processing of personal data. Deployment program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Deployment program 200 provides information regarding personal data and the nature (e.g., type, scope, purpose, duration, etc.) of the processing. Deployment program 200 provides the user with copies of stored personal data. Deployment program 200 allows the correction or completion of incorrect or incomplete personal data. Deployment program 200 allows the immediate deletion of personal data.

Distributed data processing environment 100 includes server 140, response vehicle 130, and client device 120, all interconnected over network 110. Network 110 can be, for example, a telecommunications network, a local area network (LAN) a municipal area network (MAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140, response vehicle 130, and client device 120, and other computing devices (not shown) within distributed data processing environment 100.

Client device 120 can be one or more of a laptop computer, a tablet computer, a smart phone, smart watch, a smart speaker, virtual assistant, autonomous vehicle, or any programmable electronic device capable of communicating with various components and devices within distributed data processing environment 100, via network 110. In general, client device 120 represents one or more programmable electronic devices or combination of programmable electronic devices capable of executing machine readable program instructions and communicating with other computing devices (not shown) within distributed data processing environment 100 via a network, such as network 110. Client device 120 may include components as depicted and described in further detail with respect to FIG. 3, in accordance with embodiments of the present invention.

Client device 120 includes user interface 122, application 124, sensor 126, and communication module 128. In various embodiments of the present invention, a user interface is a program that provides an interface between a user of a device and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, e-mail program, or other media, etc.). In one embodiment, application 124 is mobile application software. For example, mobile application software, or an "app," is a computer program designed to run on smart phones, tablet computers and other mobile devices. In another embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application 124 is a client-side application of deployment program 200.

Sensor 126 is a device, module, machine, or subsystem whose purpose is to detect events or changes in its environment and send the information to other electronics, frequently a computer processor. Generally, sensor 126 represents a variety of sensors of client device 120 that collects and provides various kinds of data (e.g., proximity, infrared, image, motion, acceleration, radar, light, etc.). In one embodiment, client device 120 transmits data of sensor 126 to server 140 via network 110. For example, sensor 126 may be a camera, radar, ultrasonic or lidar sensor that client device 120 utilizes for autonomous driving and to detect the speed and distance of nearby objects, as well as three-dimensional shape of the objects, which may be transmitted to a remote server (e.g., server 140), response vehicle 130, or a second instance of client device 120 via vehicle-to-vehicle (V2V) communication. In another example, sensor 126 is a module of a global navigation system that provides geolocation information of an object. For example, a geo-spatial metrics module (e.g., sensor 126) provides real-time geolocation data for an autonomous vehicle (e.g., client device 120).

In another embodiment, a user authorizes deployment program 200 to collect and process data of sensor 126. For example, an owner of an autonomous vehicle opts-in to deployment program 200 to allow deployment program 200 to collect speed, route, traffic, and braking data (e.g., information) of the autonomous vehicle to utilize in various embodiments of the present invention.

Communication module 128 may be a radio transmitter/receiver, application, or a computer utilized to transmit communications of client device 120. Generally, communication module 128 handles the exchange of messages between modules on different computing devices. In one embodiment, communication module 128 can transmit and receive one or more vehicle-to-vehicle (V2V) communications via network 110. For example, communication module 128 provides speed, route, traffic, and braking data (e.g., information) of a first autonomous vehicle (e.g., client device 120) to a second autonomous vehicle (not shown)

utilizing wireless access in vehicular environment (WAVE) standards (e.g., network 110). In another embodiment, communication module 128 can transmit travel conditions of a route based on data of sensor 126 to deployment program 200.

Response vehicle 130 can be one or more of an autonomous vehicle, unmanned aerial vehicle, or any programmable electronic device capable of communicating with various components and devices within distributed data processing environment 100, via network 110. In general, response vehicle 130 represents one or more programmable electronic devices or combination of programmable electronic devices capable of executing machine readable program instructions and communicating with other computing devices (not shown) within distributed data processing environment 100 via a network, such as network 110. Response vehicle 130 may include components as depicted and described in further detail with respect to FIG. 3, in accordance with embodiments of the present invention.

Response vehicle 130 includes user interface 132, application 134, sensor 136, and communication module 138. In various embodiments of the present invention, components (e.g., user interface 132, application 134, sensor 136, communication module 138, etc.) of response vehicle 130 perform tasks and functions equivalent to corresponding components of client device 120 (e.g., user interface 122, application 124, sensor 126, communication module 128, etc.). In one embodiment, response vehicle 130 is a dedicated unmanned aerial vehicle (UAV). For example, response vehicle 130 is a drone that deployment program 200 utilizes to rescue stalled autonomous vehicles (e.g., client device 120).

In another embodiment, response vehicle 130 is an advanced autonomous vehicle. For example, response vehicle 130 is an advanced autonomous vehicle, which can be a high-performance autonomous vehicle that includes components (e.g., sensors) that perform high-level surrounding environment recognition functions, that deployment program 200 utilizes to platoon and rescue stalled autonomous vehicles (e.g., client device 120). In yet another embodiment, response vehicle 130 can transport one or more instances of sensor 126 to a predetermined geolocation. For example, response vehicle 130 can include one or more high-performance sensors that client device 120 can utilize to increase function and performance in difficult or hazardous driving conditions.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 3, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120 and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, and deployment program 200. Storage device 142 can be implemented with any type of storage device, for example, persistent storage 305, which is capable of storing data that may be accessed and utilized by client device 120, response vehicle 130, and server 140, such as a database server, a hard disk drive, or a flash memory. In one embodiment storage device 142 can represent multiple storage devices within server 140. Database 144 may represent one or more organized collections of data stored and accessed from server 140. For example, database 144 includes planned routes of an autonomous vehicle, sensor data, travel conditions of planned routes, locations, driving difficulty scores, etc. In one embodiment, data processing environment 100 can include additional servers (not shown) that host additional information that accessible via network 110.

Generally, deployment program 200 estimates a presence and the position of an autonomous vehicle in an incommunicable area that requires assistance in the incommunicable area. In one embodiment, deployment program 200 determines a planned route of client device 120. For example, deployment program 200 retrieves a route of client device 120 from a navigational system (e.g., application 124) of client device 120. In another embodiment, deployment program 200 determines a stall position of client device 120. For example, deployment program 200 determines a driving difficulty for one or more segments of a planned route of client device 120 based on conditions that effect driving performance and/or capabilities of client device 120. In this example, deployment program 200 predicts a geolocation that client device 120 based on performance capabilities of client device 120, travel time of client device 120, and/or conditions of an environment of roadways along the planned route.

In another embodiment, deployment program 200 dispatches response vehicle 130 to a determined stall position of client device 120. For example, deployment program 200 instructs response vehicle 130 to travel to a geolocation where client device 120 is likely stalled. In yet another embodiment, deployment program 200 provides response vehicle 130 with an evacuation task to assist client device 120. For example, deployment program 200 utilizes response vehicle 130 to provide client device 120 with one or more sensors (e.g., sensor 126) to increase performance capabilities of client device 120. In another example, deployment program 200 utilizes response vehicle 130 to platoon and guide one or more instances of client device 120 to an area of the planned route with a determined driving difficulty where performance capabilities of client device 120 are suitable.

Figure 2:
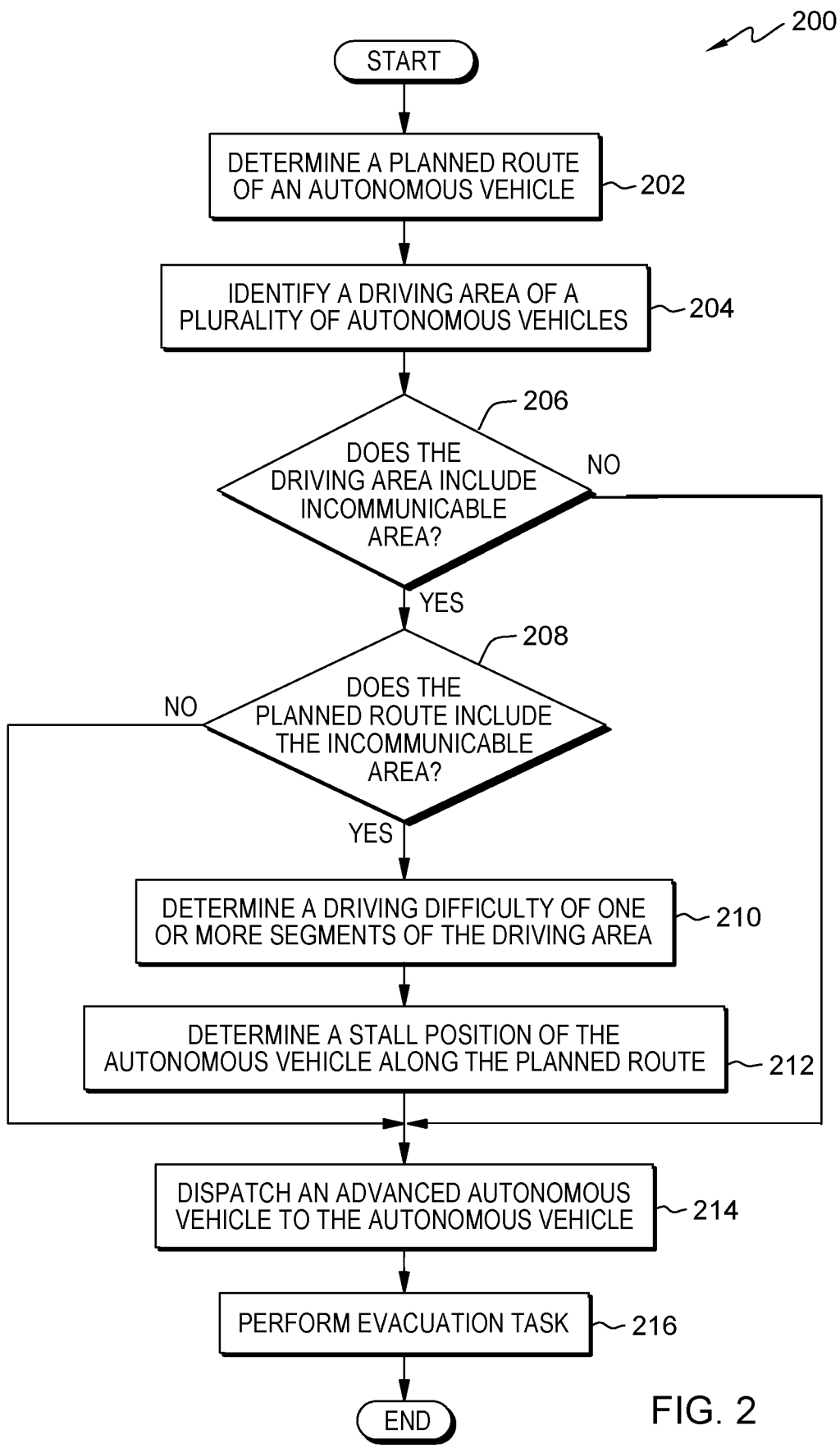
FIG. 2 is a flowchart depicting operational steps of a program for assisting a stalled autonomous vehicle in an incommunicable area, in accordance with embodiments of the present invention.

FIG. 2 is a flowchart depicting operational steps of deployment program 200, a program for assisting a stalled autonomous vehicle in an incommunicable area, in accordance with embodiments of the present invention. In one embodiment, deployment program 200 initiates in response to a user connecting client device 120 to deployment program 200 through network 110. For example, deployment program 200 initiates in response to a user registering (e.g., opting-in) an autonomous vehicle (e.g., client device 120) with deployment program 200 via a WLAN (e.g., network 110). In another embodiment, deployment program 200 is a background application that continuously monitors client device 120. For example, deployment program 200 is a client-side application (e.g., application 124) that initiates upon booting of an autonomous vehicle (e.g., client device 120) of a user and monitors data of the autonomous vehicle.

In step 202, deployment program 200 determines a planned route of an autonomous vehicle. In various embodiments of the present invention an owner/user of client device 120 opts into deployment program 200, which allows collection of various types of information from client device 120 including but not limited to GPS data, navigational data, vehicle specification, etc. In one embodiment, deployment program 200 retrieves data of client device 120 to determine a route of client device 120. For example, deployment program 200 retrieves a route of a navigational system (e.g., application 124) of an autonomous vehicle (e.g., client device 120) to determine a planned route of the autonomous vehicle. In another example, deployment program 200 retrieves event data (e.g., addresses of scheduled events) of a calendar application of a mobile device of a user and correlate event data with a current geolocation of an autonomous vehicle (e.g., client device 120) to identify a planned route of the user.

Generally, embodiments of the present invention address situations that include emergency events where an operator evacuates a vehicle to a safe location via remote operations. In the event of a disaster such as an earthquake, eruption, typhoon, hurricane, or forest fire, it is probable that autonomous vehicles will become unable to travel due to road damage and road obstacles. Additionally, that communications will be blocked due to power outages and/or sediment disasters and as a result rescue by means of a remote operation will become difficult. Also, embodiments of the present invention consider the fact that performance of autonomous vehicles can differ significantly on a vehicle to vehicle basis, resulting in the superiority of certain vehicles in the event of a disaster. For example, a high-performance autonomous vehicle (e.g., advanced autonomous vehicle, response vehicle 130, etc.) that includes a function of high-level surrounding environment recognition is likely to be able to continue autonomous driving even in the event of a disaster. However, a low-price vehicle with a small number of equipped sensors or a low-function autonomous vehicle which assumes intervention by a human operator is expected to be unable to continue autonomous driving like in the normal situation.

In step 204, deployment program 200 identifies a driving area of a plurality of autonomous vehicles. In one embodiment, deployment program 200 utilizes a plurality of autonomous vehicles to identify conditions of roads within network 110. For example, deployment program 200 collects information of one or more advanced autonomous vehicles to determine conditions of road environments along roads within a municipal area network (MAN). In this example, deployment program 200 stores information about obstacles (e.g., debris, sediment coverage, traffic information, weather events, disaster events, etc.) of the roads from the advanced autonomous vehicles while traversing the roads in a storage device of a remote server (e.g., server 140).

Additionally, deployment program 200 collects vehicle attributes of the advanced autonomous vehicles and correlates the vehicle attributes (e.g., vehicle dimensions, vehicle make, vehicle model, tire type, drive train capabilities, sensor capabilities, etc.) to the collected road conditions. In one scenario, if the advanced autonomous vehicles are within an incommunicable area of the MAN, then deployment program 200 collects road conditions from the advanced autonomous vehicles upon entry into a communicable area. In another embodiment, deployment program 200 utilizes response vehicle 130 to identify conditions of roads within network 110. For example, deployment program 200 utilizes video data of a camera (e.g., sensor 136) of a UAV (e.g., response vehicle 130) that traverses roads of incommunicable areas (e.g., disaster effected area) of a MAN (e.g., network 110) to identify obstacles of the roads and generate/update a map.

In decision step 206, deployment program 200 determines whether the driving area includes an incommunicable area. In one embodiment, deployment program 200 determines whether one or more access points of network 110 are available to client device 120. For example, deployment program 200 can poll one or more registered nodes (e.g., access points, routers, etc.) of a publicly available network (e.g., MAN, network 110, etc.) of a driving area to determine a status of registered nodes of the driving area. In this example, deployment program 200 utilizes a response to the poll to determine whether the driving area includes an incommunicable area (e.g., outage, limited connectivity, disabled, etc.).

If deployment program 200 determines that one or more access points of network 110 are available to client device 120 (decision step 206, "NO" branch), then deployment program 200 dispatches response vehicle 130 to a location of client device 120. In one scenario, if in response to polls of one or more registered nodes of a publicly available network (e.g., MAN, network 110, etc.) within a driving area, deployment program 200 determines that the responses to the polls do not indicate limited connectivity of the one or more registered nodes in the driving area, then deployment program 200 dispatches an advanced autonomous vehicle (e.g., response vehicle 130) to a geolocation of the autonomous vehicle.

If deployment program 200 determines that one or more access points of network 110 are not available to client device 120 (decision step 206, "YES" branch), then deployment program 200 determines whether a planned route of client device 120 includes one or more unavailable access points of network 110. In one scenario, if in response to polls of one or more registered nodes of a publicly available network (e.g., MAN, network 110, etc.) within a driving area, deployment program 200 determines that the responses to the polls indicate an outage in the driving area, then deployment program 200 determines whether the outage effects one or more segments of roads of the planned route as discussed in step 208. In another scenario, once an advanced autonomous vehicle (e.g., response vehicle 130) exits an incommunicable area and enters a communicable area, then the advanced autonomous vehicle transmits the collected communication information and road conditions to a storage device of a remote server (e.g., server 140).

In decision step 208, deployment program 200 determines whether the planned route includes an incommunicable area. In one embodiment, deployment program 200 determines whether a planned route of client device 120 includes one or more access points of network 110 with an unavailable status. For example, deployment program 200 correlates one or more registered nodes of a publicly available network (e.g., MAN, network 110, etc.) with one or more road segments of a planned route of an autonomous vehicle (e.g., client device 120) to determine whether an outage (e.g., incommunicable area of network) encompasses a segment of the planned route of the autonomous vehicle.

If deployment program 200 determines that a planned route of client device 120 does not include one or more access points of network 110 with an unavailable status (decision step 208, "NO" branch), then deployment program 200 dispatches response vehicle 130 to a location of client device 120. In one scenario, if deployment program 200 does not identify one or more unavailable registered nodes of a publicly available network (e.g., MAN, network 110, etc.) within a threshold distance (e.g., broadcast range) of one or more road segments of a planned route of an autonomous vehicle (e.g., client device 120), then deployment program 200 dispatches an advanced autonomous vehicle (e.g., response vehicle 130) to a geolocation of the autonomous vehicle.

If deployment program 200 determines that one or more access points of network 110 are not available to client device 120 (decision step 206, "YES" branch), then deployment program 200 determines a driving difficulty of one or more segments of network 110 utilizing response vehicle 130. In one scenario, if deployment program 200 correlates one or more registered nodes of a publicly available network (e.g., MAN, network 110, etc.) with one or more road segments of a planned route of an autonomous vehicle (e.g., client device 120), then deployment program 200 determines a driving difficulty of one or more segments of roads within the area as discussed in step 210.

In step 210, deployment program 200 determines a driving difficulty of one or more segments of an area. In one embodiment, deployment program 200 determines a driving difficulty of one or more segments of network 110 utilizing response vehicle 130. For example, deployment program 200 utilizes an advanced autonomous vehicle (e.g., response vehicle 130) traveling in a disaster area where communication is blocked. In this example, deployment program 200 utilizes a client-side application (e.g., application 124) of the advanced autonomous vehicle to capture images and or video data of road conditions (e.g., road marking and sign visibility, debris, etc.) related to autonomous driving difficulty of each road link or mesh. Further, deployment program 200 can utilize a client-side application (e.g., application 124) of the advanced autonomous vehicle to transmit the road conditions to a storage device of a remote server (e.g., server 140) when the advanced autonomous vehicle reaches a communicable area of a MAN (e.g., network 110) where deployment program 200 digitizes (e.g., determine a driving difficulty) the road conditions based on the captured images and/or video data.

Additionally, deployment program 200 can define driving difficulty on a scale of one (1) to ten (10), which is the highest score, as follows: (1) Difficulty 1 to 3: The area is easily passable by only referencing maps; (2) Difficulty 4 to 6: Lines and markings on the road are not recognizable due to being buried in sediment and recognize the surrounding environment is more or less difficult; and (3) Difficulty 7 to 10: Debris is left unattended and full use of advanced environment recognition functions is necessary to avoid obstacles. Also, deployment program 200 can consider driving performance (e.g., vehicle dimensions, all-terrain capabilities, performance parts, etc.), travel time information (e.g., cargo type, destinations, latest positional information, etc.), and/or road environment (e.g., weather, traffic information, road closures, etc.) as factors in determining a driving difficulty.

In another embodiment, deployment program 200 utilizes response vehicle 130 to generate a disaster map. For example, deployment program 200 can deploy a dedicated UAV to an incommunicable area of a disaster event to collect information (e.g., pass-ability, road conditions, etc.) that deployment program 200 can utilize to update a disaster map of roads within a MAN (e.g., network 110) or in addition to collected information of an advanced autonomous vehicle. In this example, deployment program 200 can prioritize dispatch of the dedicated UAV (e.g., response vehicle 130) to certain areas based on one or more factors (e.g., traffic density, available network resources, etc.) in order to cover less frequently traveled areas. In another embodiment, deployment program 200 determines a driving difficulty of one or more segments of a planned route of client device 120. For example, deployment program 200 correlates a planned route of an autonomous vehicle (e.g., client device 120) as discussed in step 202 with an autonomous driving difficulty of each road link or mesh within a MAN (e.g., network 110) to determine a driving difficulty of the planned route.

In step 212, deployment program 200 determines a stall position of the autonomous vehicle along the planned route. Various embodiments of the present invention utilize driving difficulties to predict the presence and/or location of a low-function autonomous vehicle that is unable to traverse a road segment due to conditions caused by a disaster event. Generally, deployment program 200 estimates the presence and a position of a low-function autonomous vehicle that is likely to encounter driving conditions where autonomous driving is impossible or difficult in an incommunicable area. Deployment program 200 can utilize the autonomous driving difficulty per road segment or mesh in the reported incommunicable area, travel history and/or a planned route of the vehicle immediately before a communication breakdown, and the performance of the vehicle (e.g., vehicle attributes). Furthermore, deployment program 200 can utilize a machine learning algorithm that statistically estimates a geolocation in a planned travel route where the autonomous vehicle will likely be unable to traverse, which provides an advancement to existing routing algorithms (e.g., most probable path, etc.).

In one embodiment, deployment program 200 determines a stall location of client device 120 along a planned route. For example, deployment program 200 can utilize an algorithm to determine one or more candidates of untravellable segments of a planned route of an autonomous vehicle (e.g., client device 120). In this example, deployment program 200 collates the planned route of the autonomous vehicle with autonomous driving difficulty information (e.g., difficulty segments, difficulty map, etc.), as discussed in step 210, and determines the one or more candidates of untravellable segments within the planned route with respect to vehicle attributes of the autonomous vehicle.

In addition, deployment program 200 selects an untravellable segment candidate by determining whether the capabilities of the autonomous vehicle are less than a defined threshold value corresponding to the autonomous difficulty information. In one scenario, deployment program 200 assigns a segment of road a driving difficulty score of six (6) (e.g., defined threshold value) due to snow covering lines of the road and reducing visibility. Additionally, deployment program 200 determines client device 120 is a low function autonomous vehicle that is rated for driving difficulties up to a driving difficulty of five (5) due to a small number of equipped sensors and vehicle attributes (e.g., two-wheel drive, summer tires, etc.). Furthermore, deployment program 200 can select the segment of road as an untravellable segment candidate due to determining client device 120 rating (e.g., 5) is less than the driving difficulty score (e.g., defined threshold value) the segment of road (i.e., based on the capabilities of client device 120 traversal of a road with certain conditions is not probable).

In another example, deployment program 200 predicts a current position of a low function autonomous vehicle (e.g., client device 120). In this example, deployment program 200 classifies vehicle travel time information and road conditions of a segment of road based on a driving difficulty. Additionally, deployment program 200 utilizes the driving difficulty with respect to autonomous driving performance of the low function autonomous vehicle to determine a probable stall location of the vehicle.

In another embodiment, deployment program 200 determines a location of client device 120. For example, deployment program 200 predicts a geolocation of an autonomous vehicle (e.g., client device 120) within one or more candidates of untravellable segments. In this example, deployment program 200 estimates the geolocation within the one or more candidates of untravellable segments of the planned route where the autonomous vehicle is probable to have become unable to travel based on a routing algorithm (e.g., Most Probable Path (MPP), etc.) and assigns a confidence value (e.g., on a scale of zero (0) to one hundred (100) where (100) indicates a higher probability) to the geolocation of the one or more candidates of untravellable segments. Additionally, deployment program 200 can also consider time elapsed from a communication breakdown (e.g., retrieved from connectivity data of network 110) and/or a latest update time of driving difficulty information (e.g., provided by a plurality of advanced autonomous vehicles) to determine or modify confidence values of road conditions as the road conditions can change over time.

In an alternative example, while traveling in an incommunicable area of a MAN (e.g., client network 110) an advanced autonomous vehicle (e.g., response vehicle 130) exchanges vehicle identification information with a low-function autonomous vehicle (e.g., client device 120) via inter-vehicle communication (e.g., V2V communication, communication module(s), etc.), and records a geolocation and vehicle condition (e.g., availability of autonomous driving) of the low-function autonomous vehicle. In this example, the advanced autonomous vehicle (e.g., response vehicle 130) can communicate the recorded geolocation and vehicle condition to deployment program 200 in a notification while traveling in a communicable area of the MAN.

In step 214, deployment program 200 dispatches an advanced autonomous vehicle to the autonomous vehicle. In one embodiment, deployment program 200 sends response vehicle 130 to a determined geolocation of client device 120. For example, deployment program 200 predicts a low-function autonomous vehicle (e.g., client device 120) is unable to travel in an incommunicable area of a MAN (e.g., network 110) and transmits a notification that includes dispatch information (e.g., predicted geolocation, vehicle identification information, etc.) corresponding to the low-function autonomous vehicle to an advanced autonomous vehicle (e.g., response vehicle 130) traveling in a communicable area of the MAN.

In one scenario, deployment program 200 estimates the low-function autonomous vehicle is unable to travel but the advanced autonomous vehicle enters a communicable area notifies deployment program 200 of positional information of the low-function autonomous vehicle. Additionally, deployment program 200 determines that the low-function autonomous vehicle is moving and determines the low-function autonomous vehicle is capable of travel and transmit a notification to the advanced autonomous vehicle canceling a rescue dispatch.

Various embodiments of the present invention recognize that many vehicles becoming unable to travel in the event of a disaster at the same time is probable. Embodiments of the present invention efficiently rescue vehicles requiring assistance in an incommunicable area. In another embodiment, determines a priority between two or more instances of client device 120. For example, deployment program 200 identifies one or more conditions of one or more low-functioning autonomous vehicles (e.g., client device 120) within an incommunicable area (e.g., disaster area) of a MAN and ranks the one or more low-functioning autonomous vehicles based on the one or more conditions. In this example, deployment program 200 identifies one or more conditions associated with a low-functioning autonomous vehicle (e.g., client device 120) indicate safety (e.g., combustibles, hazardous materials, etc.) and/or emergency (e.g., time sensitive deliverables, destinations, etc.) concerns. Additionally, deployment program 200 ranks dispatch of an advanced autonomous vehicle to the one or more low-functioning autonomous vehicles based on the one or more conditions. In one scenario, deployment program 200 utilizes visual recognition techniques to identify signage of a vehicle carrying combustible materials (e.g., safety concern) and determines that the vehicle, which is within an area affected by forest fires ranks higher than a truck identifies as carrying produce.

In step 216, deployment program 200 performs evacuation task. In various embodiments of the present invention, response vehicle 130 can function to provide information indicative of autonomous driving difficulty, and to rescue vehicles unable to travel in the incommunicable area. In one embodiment, deployment program 200 utilizes response vehicle 130 to assist client device 120. For example, response vehicle 130 can be a dedicated UAV or advanced autonomous vehicle. In this example, deployment program 200 provides the advanced autonomous vehicle instructions to platoon low-functioning autonomous vehicles (e.g., client device 120) together and guide the low-functioning autonomous vehicles to an area where the low-functioning autonomous vehicles are able to travel without assistance. In an alternative example, deployment program 200 utilizes the advanced autonomous vehicle provides substitute sensor information (e.g., road environment conditions) to low-functioning autonomous vehicles (e.g., client device 120), which the low-functioning autonomous vehicles utilize to traverse road segments of an incommunicable area affected by a disaster.

As a further additional feature, deployment program 200 can utilize a dedicated UAV (e.g., response vehicle 130) to deliver updated disaster map, which includes information indicating whether a road segment can be traversed based on road conditions, to low-functioning autonomous vehicles (e.g., client device 120) that the dedicated UAV comes within a threshold distance (e.g., based on capabilities of communication module(s) of FIG. 1) to while traveling in an incommunicable area.

Figure 3:
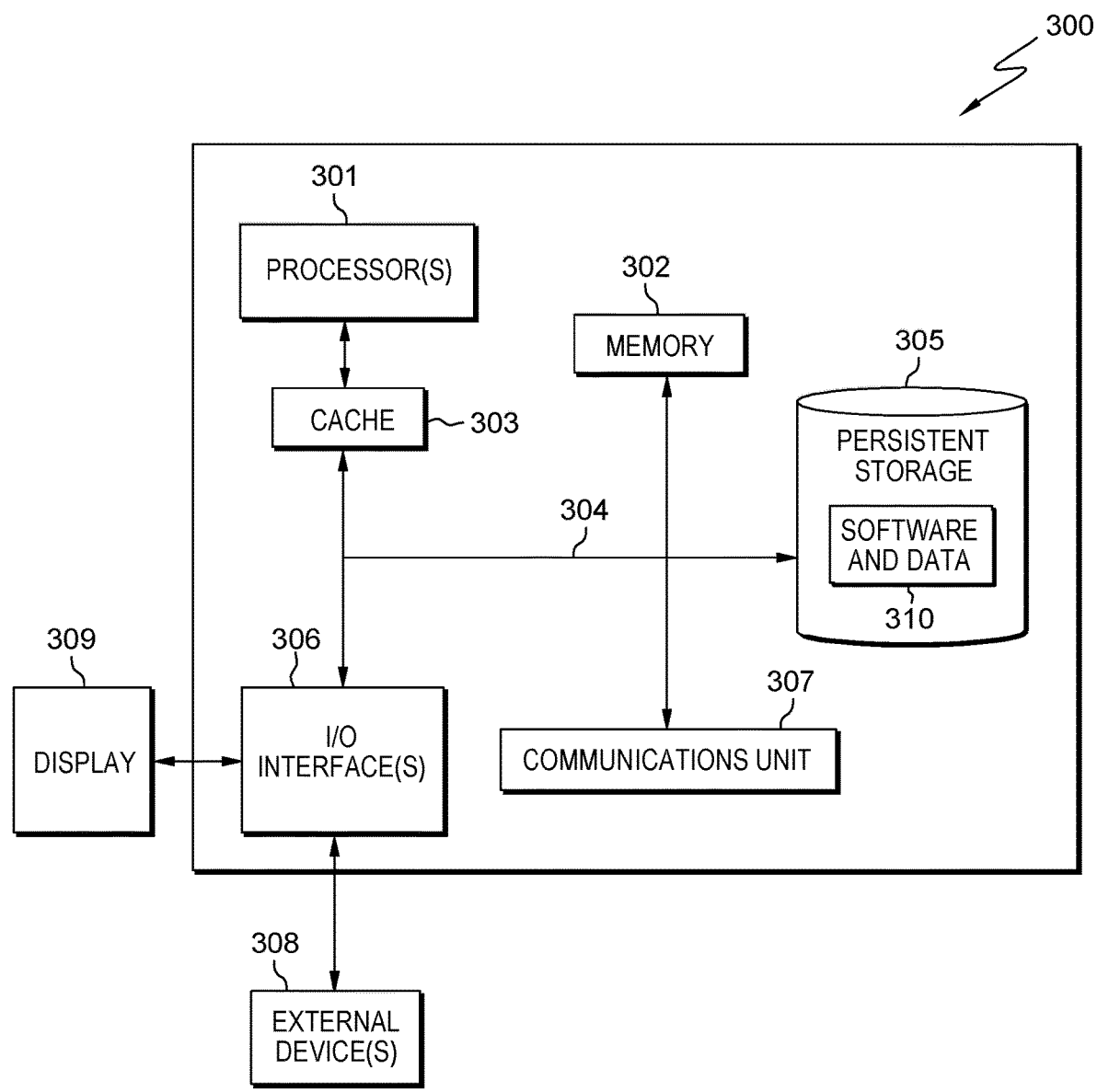
FIG. 3 is a block diagram of components of FIG. 1, in accordance with an embodiment of the present invention.

FIG. 3 depicts a block diagram of components of client device 120, response vehicle 130 and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 120, software and data 310 includes data of user interface 122, application 124, sensor 126, and communications module 128. With respect to response vehicle 130, software and data 310 includes data of user interface 132, application 134, sensor 136, and communications module 138. With respect to server 140, software and data 310 includes data of storage device 142 and deployment program 200.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    determining, by one or more processors, a traveled route of a first autonomous vehicle;
    identifying, by one or more processors, an area of the traveled route of the first autonomous vehicle that includes a communication outage;
    determining, by one or more processors, a driving difficulty score of one or more segments of the traveled route of the first autonomous vehicle within the area;
    determining, by one or more processors, a location of the first autonomous vehicle within a segment of the one or more segments of the traveled route based at least in part on the driving difficulty score of the segment;
    determining, by one or more processors, a functional score for a second autonomous vehicle, wherein the functional score corresponds to one or more sensors of the second autonomous vehicle;
    identifying, by one or more processors, a planned route of the second autonomous vehicle traversing the segment of the traveled route of the first autonomous vehicle; and
    in response to the functional score of the second autonomous vehicle being less than the driving difficulty score, dispatching, by one or more processors, a response vehicle to assist the second autonomous vehicle in traversing the untravellable segment of the route.

2. The method of claim 1, further comprising:
    generating, by one or more processors, substitute sensor information corresponding to the segment based at least in part on sensor data of the response vehicle, wherein assisting the second autonomous vehicle in traversing the untravellable segment of the route comprises sending the substitute sensor information from the response vehicle to the second autonomous vehicle.

3. The method of claim 1, wherein identifying the area of the route of the autonomous vehicle that includes the communication outage, further comprises:
    determining, by one or more processors, a connectivity status of a plurality of nodes of a network based at least in part on a response to polls of one or more autonomous vehicles; and correlating, by one or more processors, the connectivity status of the plurality of nodes with the one or more segments of the planned route of the second autonomous vehicle.

4. The method of claim 1, wherein determining the driving difficulty score of one or more segments of the traveled route of the first autonomous vehicle within the area, further comprises:
identifying, by one or more processors, a set of conditions of a road environment of the one or more segments based on sensor data of a plurality of autonomous vehicles traversing the area; and
determining, by one or more processors, the driving difficulty score for each of the one or more segments based on the set of conditions of the road environment.

5. The method of claim 1, wherein determining the location of the first autonomous vehicle within the segment of the one or more segments of the route, further comprises:
estimating, by one or more processors, a geolocation of the first autonomous vehicle using a routing algorithm based at least in part on time elapsed from a communication breakdown of the first autonomous vehicle; and
assigning, by one or more processors, a confidence value to the geolocation based at least in part on an update time of driving difficulty information.

6. A computer program product comprising:
one or more computer readable storage media and program instructions stored on the one or more computer readable storage media, the program instructions comprising:
program instructions to determine a traveled route of a first autonomous vehicle;
program instructions to identify an area of the travelled route of the first autonomous vehicle that includes a communication outage;
program instructions to determine a driving difficulty score of one or more segments of the traveled route of the first autonomous vehicle within the area;
program instructions to determine a location of the first autonomous vehicle within a segment of the one or more segments of the traveled route based at least in part on the driving difficulty score of the segment;
program instructions to determine a functional score for a second autonomous vehicle, wherein the functional score corresponds to one or more sensors of the second autonomous vehicle;
program instructions to identify a planned route of the second autonomous vehicle traverses the segment of the traveled route of the first autonomous vehicle; and
program instructions, in response to the functional score of the second autonomous vehicle being less than the driving difficulty score, to dispatch a response vehicle to assist the second autonomous vehicle in traversing the untravellable segment of the route.

7. The computer program product of claim 6, further comprising program instructions, stored on the one or more computer readable storage media, to:
generate substitute sensor information corresponding to the segment based at least in part on sensor data of the response vehicle, wherein assisting the second autonomous vehicle in traversing the untravellable segment of the route comprises sending the substitute sensor information from the response vehicle to the second autonomous vehicle.

8. The computer program product of claim 6, wherein program instructions to identify the area of the route of the autonomous vehicle that includes the communication outage, further comprise program instructions to:
determine a connectivity status of a plurality of nodes of a network based at least in part on a response to polls of one or more autonomous vehicles; and
correlate the connectivity status of the plurality of nodes with the one or more segments of the planned route of the second autonomous vehicle.

9. The computer program product of claim 6, wherein determining the driving difficulty score of one or more segments of the traveled route of the first autonomous vehicle within the area, further comprise program instructions to:
identify a set of conditions of a road environment of the one or more segments based on sensor data of a plurality of autonomous vehicles traversing the area; and
determine the driving difficulty score for each of the one or more segments based on the set of conditions of the road environment.

10. The computer program product of claim 6, wherein program instructions to determine the location of the first autonomous vehicle within the segment of the one or more segments of the route, further comprise program instructions to:
estimate a geolocation of the first autonomous vehicle using a routing algorithm based at least in part on time elapsed from a communication breakdown of the first autonomous vehicle; and
assign a confidence value to the geolocation based at least in part on an update time of driving difficulty information.

11. A computer system comprising:
one or more computer processors;
one or more computer readable storage media; and
program instructions stored on the computer readable storage media for execution by at least one of the one or more processors, the program instructions comprising:
program instructions to determine a traveled route of a first autonomous vehicle;
program instructions to identify an area of the travelled route of the first autonomous vehicle that includes a communication outage;
program instructions to determine a driving difficulty score of one or more segments of the traveled route of the first autonomous vehicle within the area;
program instructions to determine a location of the first autonomous vehicle within a segment of the one or more segments of the traveled route based at least in part on the driving difficulty score of the segment;
program instructions to determine a functional score for a second autonomous vehicle, wherein the functional score corresponds to one or more sensors of the second autonomous vehicle;
program instructions to identify a planned route of the second autonomous vehicle traverses the segment of the traveled route of the first autonomous vehicle; and
program instructions, in response to the functional score of the second autonomous vehicle being less than the driving difficulty score, to dispatch a response vehicle to assist the second autonomous vehicle in traversing the untravellable segment of the route.

12. The computer system of claim 11, further comprising program instructions, stored on the one or more computer readable storage media for execution by at least one of the one or more processors, to:
   generate substitute sensor information corresponding to the segment based at least in part on sensor data of the response vehicle, wherein assisting the second autonomous vehicle in traversing the untravellable segment of the route comprises sending the substitute sensor information from the response vehicle to the second autonomous vehicle.

13. The computer system of claim 11, wherein program instructions to identify the area of the route of the autonomous vehicle that includes the communication outage, further comprise program instructions to:
   determine a connectivity status of a plurality of nodes of a network based at least in part on a response to polls of one or more autonomous vehicles; and
   correlate the connectivity status of the plurality of nodes with the one or more segments of the planned route of the second autonomous vehicle.

14. The computer system of claim 11, wherein determining the driving difficulty score of one or more segments of the traveled route of the first autonomous vehicle within the area, further comprise program instructions to:
   identify a set of conditions of a road environment of the one or more segments based on sensor data of a plurality of autonomous vehicles traversing the area; and
determine the driving difficulty score for each of the one or more segments based on the set of conditions of the road environment.

* * * * *